US009079790B2

(12) United States Patent
Zagt (10) Patent No.: US 9,079,790 B2
(45) Date of Patent: Jul. 14, 2015

(54) SYSTEM AND METHOD FOR PURIFYING AN AQUEOUS ORGANIC MATTER, WASTE AND/OR WASTEWATER UNDER PRESSURE AND METHOD FOR PRODUCING BIOGAS

(75) Inventor: Christiaan Emanuel Zagt, Heerenveen (NL)

(73) Assignee: Zagt Zelf B.V., Heerenveen (NL)

( * ) Notice: Subject to any disclaimer, the term of this patent is extended or adjusted under 35 U.S.C. 154(b) by 612 days.

(21) Appl. No.: 13/343,213

(22) Filed: Jan. 4, 2012

(65) Prior Publication Data
US 2012/0164706 A1 Jun. 28, 2012

Related U.S. Application Data (63) Continuation-in-part of application No. PCT/NL2010/000105, filed on Jul. 7, 2010.

(30) Foreign Application Priority Data

Jul. 8, 2009 (NL) ..................................... 1037103

(51) Int. Cl.
C02F 3/28 (2006.01)
C02F 11/04 (2006.01)
(Continued)

(52) U.S. Cl.
CPC ............... *C02F 11/04* (2013.01); *B01D 53/22* (2013.01); *C02F 3/28* (2013.01); *C02F 1/44* (2013.01); *C02F 2301/066* (2013.01); *Y02E 50/343* (2013.01)

(58) Field of Classification Search
CPC ... Y02E 50/343; C02F 3/28; C02F 2301/066; C02F 1/44; C02F 11/04; C12M 1/107; B01D 53/22

USPC .................. 210/603, 609, 614, 188, 252, 259
See application file for complete search history.

(56) References Cited

U.S. PATENT DOCUMENTS 6,296,766 B1 10/2001 Breckenridge
2002/0079266 A1* 6/2002 Ainsworth et al. ........... 210/603
(Continued)

FOREIGN PATENT DOCUMENTS

DE 3709174 9/1988
NL 1033083 4/2007
WO 03042117 5/2003

OTHER PUBLICATIONS

Machine-generated English translation of DE 3709174, dated Jul. 21, 2014.*

(Continued)

*Primary Examiner* — Fred Prince
(74) *Attorney, Agent, or Firm* — Bret E. Field; Daniel G. Stoddard; Boziceivc, Field & Francis LLP (57) ABSTRACT

The present invention concerns a system and working method for purification and/or treatment of organic waste and/or wastewater flows. The invention also concerns a working method for the production of biogas. The system according to the invention contains: a sealable pressure vessel provided with an inlet to supply a flow for purification and/or treatment whereby the pressure vessel is equipped to execute an anaerobe conversion of the flow that is to be purified/treated in, amongst others, biogas, at least one exhaust manifold for the products that need to be removed from the pressure vessel, a control system to drive the process, a pump that cooperates with the inlet to convey the flow to be purified/treated whereby the pump can be put into motion through the biogas from the pressure vessel.

19 Claims, 5 Drawing Sheets

(51) Int. Cl.
   *B01D 53/22* (2006.01)
   *C02F 1/44* (2006.01)

(56) References Cited

U.S. PATENT DOCUMENTS

2003/0173291 A1   9/2003   Schimel
2004/0016697 A1*  1/2004   Shaffer et al. ................. 210/610
2007/0105205 A1*  5/2007   Jarventie ....................... 435/161
2010/0089822 A1*  4/2010   Terry ............................ 210/602

OTHER PUBLICATIONS

Machine-generated English translation of NL 1033083, dated Jul. 21, 2014.*

* cited by examiner

SYSTEM AND METHOD FOR PURIFYING AN AQUEOUS ORGANIC MATTER, WASTE AND/OR WASTEWATER UNDER PRESSURE AND METHOD FOR PRODUCING BIOGAS

CROSS-REFERENCE TO RELATED APPLICATIONS

This application is a Continuation-in-Part application of International Application Serial No. PCT/NL2010/000105 filed on Jul. 7, 2010; which International application claims priority to the filing date of Netherlands Patent Application Serial No. 1037103 filed Jul. 8, 2009; the disclosures which applications are herein incorporated by reference.

INTRODUCTION

1. Field of the Invention

The present invention is related to a system to purify and/or treat organic waste and/or wastewater under high pressure. More in particularly, the system relates to a (micro-) biological method to purify and/or treat a similar diluted flow of organic material, waste and/or sewage, especially suitable to generate sustainable energy.

2. Background

Well known purification installations make use of, amongst others, vessels and/or reactors in which microorganisms are put. These microorganisms purify and/or treat the supplied influents.

The remaining flow can subsequently be processed more easily and cheaper. In practice, anaerobe processes are used.

The treated water/sludge mixture is usually separated though a sediment process. Most conventional water purification processes take place under atmospheric pressure.

SUMMARY

The present invention aims to foresee in a system to purify and/or treat a flow of organic material, waste and/or wastewater under high pressure, to be executed in a more efficient way.

This aim is reached with a system to purify and/or treat organic material, waste- and/or sewage under high pressure according to the invention, the system, containing:
- a sealable pressure vessel provided with an inlet to supply an influent to be purified and/or treated whereby the pressure vessel is equipped to execute an anaerobe conversion of the influent in, amongst others, biogas;
- at least one exhaust manifold to drain off products from the pressure vessel;
- a control system to control the purification process; and
- in cooperation with the pump that operates the inlet to supply a flow to purify and/or treat, whereby the pump can be put into motion by the biogas from the pressure vessel The bioreactor or pressure vessel is supplied with a flow (influent) consisting of a gas, fluid, solid substance or a combination thereof, to be purified and/or treated. Anaerobe conversion of the substance that is to be purified and/or treated takes place in the pressure vessel, supported by microorganisms whereby, amongst others, biogas is formed.

For that purpose, the pressure vessel is sealable. This way, auto-generative pressure is generated by formation of gas as a result of fermentation.

At least a part of the biogas, that is produced under relatively high pressure, is to be used to drive the pump to supply the flow that needs to be purified and/or treated.

Through this effective driving of the supply-pump, a closed energetic system is acquired wherein, under anaerobe conditions, nutrients such as $C_6H_{12}O_6$ are converted in $CO_2$, $CH_4$ or methane and energy with which the pressure in the pressure vessel is build.

Thus achieving that no additional energy needs to be supplied in order to convey the flow that needs to be purified and/or treated nor for conversions and pressure-build in the pressure vessel. This leads to an effective and efficient purification/treatment of the watery flow of organic materials such as wastewater. In the system, according to the invention, organic material is converted in a pressure vessel into, amongst others, pressure.

The pressure-build is used to drive a feed pump of the organic material. Additionally, the pressure-build is preferably used for other purposes such as the removal of products from the pressure vessel and/or generating additional energy.

The earlier described closed energetic system, provided with a feed pump driven by biologically built pressure, a continuous or semi-continuous working installation such as a water treatment plant, can be achieved.

Hereby it is possible to realize a so-called 'stand alone' system wherein the necessary energy to supply the organic material, is delivered from the pressure, build up in the pressure vessel.

A further advantage of the system according to the invention is that at a continuous or semi-continuous use, it's possible to maintain a more or less constant work point for the process conditions in the pressure vessel. Hereby the process can be driven most optimally over longer periods of time and in such a way that the efficiency of the system, and therefore the executed process is enhanced.

Next to that, the pressure vessel is, preferably, equipped with a sludge membrane to separate the sludge from the flow that is to be purified and/or treated.

A control system drives the entire process and/or regulates the process, whereby, amongst others, pressure in the pressure vessel can be regulated. For this purpose, valves are preferably placed in the inlet and the, at least, one exhaust manifold of the pressure vessel with which the control system can regulate the pressure in this pressure vessel. Preferably, the pressure vessel includes a first exhaust manifold for the produced biogas and a second one for the remaining water/sludge mixture of the flow to be purified and/or treated.

The system also has energy generating means in order to generate energy by using at least a part of the produced biogas. This gas contains the energy content that, for example, can be used in a next process. An example thereof is combustion of the methane formed as biogas whereby the energy, obtained from the combustion can be used in a next process.

In a system according to the invention, it is remarkable that the same biogas can be used to generate a second form of energy with the aid of energy generating means.

Hereby the biologically built up pressure in the pressure vessel is used and converted into usable energy in the form of labor.

This results into an efficient purification step of the system according to the invention with which the purifying of an influent, aided by the energy generating means, can be executed efficiently. The biogases that are formed are, preferably, methane, carbon dioxide, hydrogen-thio-carbon-acid and or hydrogen sulphide.

The formation of these gases strongly depends on the composition, the temperature and the pH value of the flow that is to be purified and/or treated.

Additionally, the formation of gas can be influenced by the choice in quantity, type of microorganisms and the conditions applied in the pressure vessel. Hereby it is possible to make an even more efficient use of the system.

Additionally, the formation of gas can be influenced by the pH of the medium in the pressure vessel. The quantity of dissolved carbon dioxide and other gasses, and the thereby applied process conditions influence the Ph in the pressure vessel.

Hereby it is possible to make an even more efficient use of the system.

In an advantageous, preferred embodiment, according to the present invention, the control system is provided with means of control in order to regulate the flow through the membrane.

Based on the pressure in the pressure vessel, the control system can control the flow through the sludge membrane. For that purpose, regulation of the in- and outgoing flows of liquids and gasses (influents and effluents) can be employed. By doing so, it is possible to separate the well-dosed flow that needs to be purified and/or treated, from the sludge in the reactor.

In a further advantageous preferred embodiment, according to the present invention, a selective membrane is installed in order to remove the carbon dioxide.

By choosing a selective gas membrane or membrane filter, it is possible to remove dissolved carbon dioxide ($H_2OCO_3$) from the water and/or gas-phase, present in the pressure vessel. The removal of this carbon dioxide generates more, purer flows in the pressure vessel.

In a further advantageous preferred embodiment according to the present invention, a selective membrane is installed in order to remove thiocarbonacid.

By choosing a selective gas membrane or membrane filter, it is possible to remove dissolved thiocarbonacid ($H_2CSO_2$) from the water and/or gas-phase, present in the pressure vessel.

Such thiocarbonacid comes into existence through pressure. The removal of this thio-carbonacid generates more, purer flows in the pressure vessel.

In an advantageous preferred embodiment according to the present invention, the system contains pressure-generating means in order to realize pressure, such that the produced biogas is additionally purified.

By realizing increasing pressure, the purity of, for example, methane in the gas phase will rise. This is caused by the fact that carbon dioxide, hydrogen sulphide and possible combinations thereof such as thio-carbonacid, according to Henrys' Law, dissolve better in a watery liquid phase than methane. This brings about the increase of the caloric value of the produced biogas (methane).

As an additional advantage the possible emission of carbon dioxide is reduced, and additionally, the quantity of hydrogen sulphide and carbon dioxide in the gas phase is also reduced. The levels of carbon dioxide and hydrogen sulphide, or possible combinations thereof such as hydrogen thiocarbonacid, are increased in the liquid phase. This accumulation enables the separation of these substances from the methane. This leads to a gas phase, in this present example, that has a higher methane quantity or purity. The extra pure methane can be used for other purposes, if required.

In an advantageous preferred embodiment, according to the present invention, the pump comprises a pneumatically driven pump.

By providing a pneumatic pump that is directly put in motion by the biologically generated gas from the pressure vessel, a second form of energy, can be made use of relatively simply in addition to the combustion heat of biogas.

The use of a so-called pneumatic pump has the advantage that it can be directly put in motion through the produced biogas from the pressure vessel, such as methane. Hereby, energy loss resulting from energy conversion is avoided.

Hereby, the efficiency of the entire system increases even further. Preferably the biologically built up, relatively high pressure from the pressure vessel is, for instance partly used to drive a so-called heat pump. By using the high pressure from the biogas from the high-pressure vessel, the yield of the heat pump can be increased. Hereby also the yield of the entire system according to the present invention is further increased.

Preferably, the system, according to the invention, is to be equipped with a control system that contains means to match the capacity of the feed pump with the pressure in the vessel. This generates additional efficiency of the system, according to the invention.

In a further, advantageous embodiment according to the present invention, the system contains a gas buffer in order to store the produced biogas.

By incorporating a gas buffer, the energy, by means of biologically generated pressure, can be stored in the pressure vessel of bioreactor, or be stored separately from the pressure vessel or bioreactor. By doing so, the generated energy can be applied efficiently at any desired moment, hereby increasing the efficiency of the system.

The invention further relates to a method to purify and/or treatment of (an) organic waste and/or sewage, consisting of the following process steps:
- provide with a system as described above;
- to supply the system with a flow to be purified and/or treated;
- to separate and remove the produced biogas from the residual flow.

Such working method offers equal effects and advantages as mentioned in the system.

Preferably, at least a part of the, under relatively high pressure produced biogas, is used to drive the flow that is to be purified or treated, in other words, the feed-pump. Herewith a closed energetic system is obtained wherein, under anaerobe conditions, nutrients such as $C_6H_{12}O_6$ or other organic hydrocarbons, are converted in gasses such as $CO_2$ or carbondioxide, $CH_4$ or methane and energy with which pressure in the pressure vessel is build. Thus achieving that no additional energy needs to be supplied in order to convey the flow that needs purification/treatment, and conversions and pressure-build in the pressure vessel. This leads to an effective and efficient purification/treatment of the watery flow of organic material, such as wastewater. In addition, the produced biogas is preferably used to generate energy by using the energy generating means. An efficient process is thus realised.

In addition, the invention relates to a working method to produce a biogas, containing the following process steps:
- provide with a system as described above;
- to supply the system with a flow to be purified and/or treated;
- to separate and remove the produced biogas from the residual flow.

Such a working method offers equal effects and advantages as mentioned with the system. In an advantageous, preferable embodiment, the biogas contains methane, which is generated in a relatively simple way.

Hereby the methane can be used in addition to the caloric value of the methane, by converting high pressure into a form of usable energy such as labour or purity of gas.

BRIEF DESCRIPTION OF THE FIGURES

Additional advantages, characteristics and details of the invention are explained by means of a preferred embodiment, referring to the attached figure, which shows.

DETAILED DESCRIPTION

Figure 1:
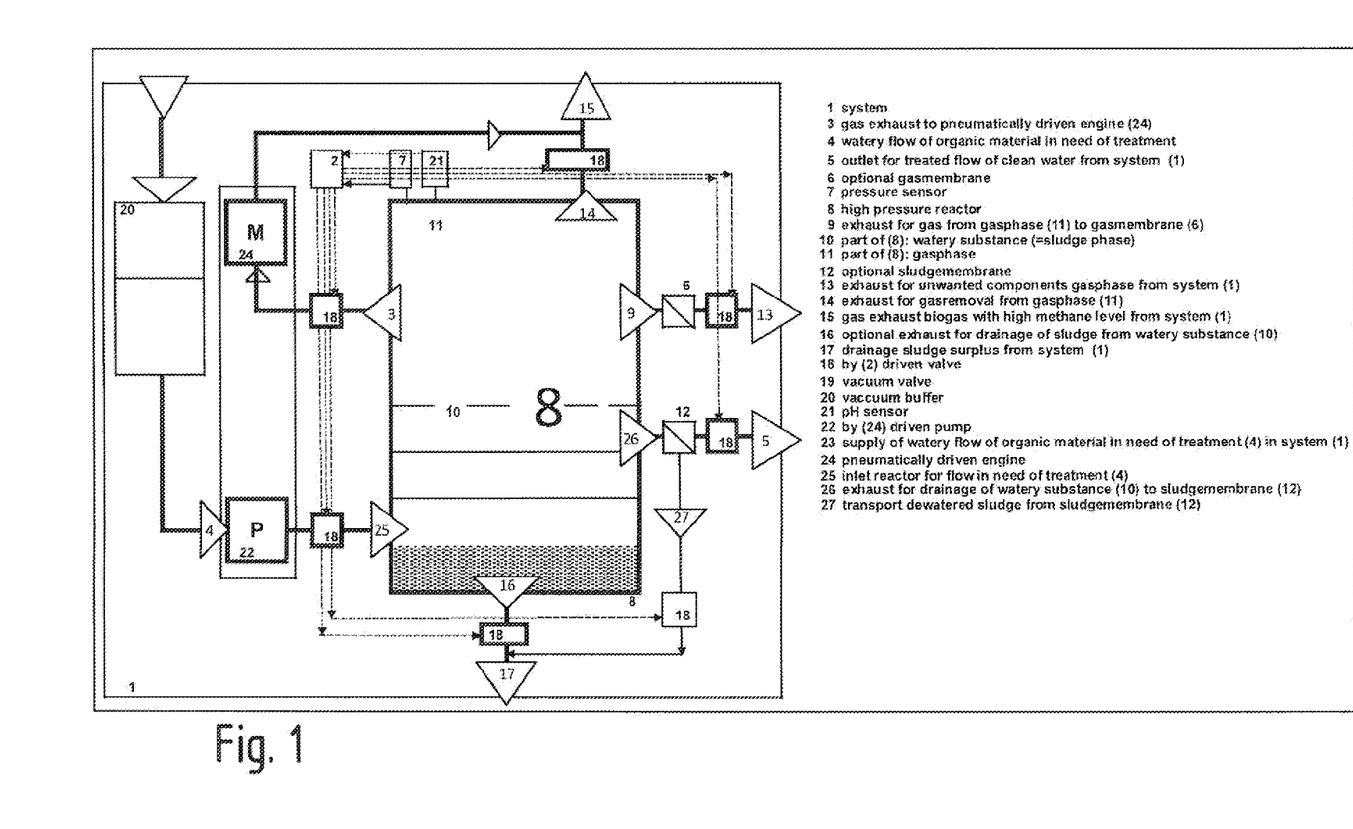
FIG. 1: a system according to the invention.

System 1 has a measure and control system 2 to control the gas flows 3, 9, 14 and/or liquid flows 4, 5, 17 through separation membranes 6, 12 powered by auto-generative biologically generated, green pressure. Measure- and control system 2 is specifically aimed to control a high-pressure membrane bioreactor 8. Reactor 8 can purify organic material, waste and/or domestic- or industrial sewage. Hereby biogas is released and clean water is produced.

System 1 consists of a vessel or tank 8 that contains a watery suspension 10 of microorganisms (the sludge) that are responsible for a biological conversion process. The biological conversion process includes the anaerobe conversion of organic material into methane, other biogases and carbon dioxide.

The produced biogas is cleansed and unwanted components such as carbon dioxide are removed by the application of a gas membrane 6. The treated water-sludge mixture is separated from each other by means of a sludge membrane 12, like in a membrane reactor.

By this separation the biological active mass is kept in the vessel whilst the clean water is separated.

System 1 contains a pressure vessel (the container or the reactor or the tank 10). This pressure vessel 8 withstands up to 100 Bar.

The purifying process takes place in this pressure vessel 8. The microorganisms in the pressure vessel 8 produce biogas through which the pressure increases auto-generatively.

This pressure is also called 'green pressure', a relatively new biological form of energy. System 1 contains a high pressure resistant bacteria culture. Because of the increasing pressure in the closed (sealed) vessel 8, the solubility of carbon dioxide in the water phase, will increase whereby less carbon dioxide ends up in the biogas. The produced biogas has therefore an extraordinary high methane level of 80 to 90 volume %.

Vessel 8 contains a two phase system, on one hand the gas phase 11 consisting of biogases and on the other hand the liquid phase 10, consisting of the water-sludge mixture.

Because of the auto-generatively increasing pressure, a driving force is created with which the produced biogas can be pressed through gas-membrane 6. One of the goals is to separate methane 15 from the unwanted components 13 as well as to regulate the acidity. Also because of the high pressure a driving force occurs through which the water-sludge mixture is pressed through the liquids-membrane 12. Another goal is to separate the clean water from the sludge.

If the partial $CO_2$ pressure rises above 73 Bar at a temperature above 31 C, supercritical $CO_2$ arises in the water-sludge mixture.

In, amongst others, the outgoing pipe (low pressure side) of both the gas drain 14 as the water-sludge mixture drain 16, valves 18 are installed that block the outgoing flow. In the shown embodiment, valves 18 are, amongst others, controlled by a pressure sensor 7 that registers the pressure in the pressure vessel 8.

If the pressure decreases as a result of the outflow of gas and/or water-sludge mixture, measure and control system 2 makes sure that the outflows are decreased.

When pressure increases again, due to biological pressure buildup, the necessary valves are put open again. A goal is to keep system 1, at a preset value, of sufficiently high pressure.

In the embodiment shown, the pressure vessel withstands an internal pressure up to 100 Bar. The pressure vessel has a pressure-meter 7, a Ph-meter 21, if needed a thermometer and a scheme to control temperature (not shown). The pressure buildup in the pressure vessel is registered by the pressure-meter.

The 'green pressure' is either directly or indirectly used to power a membrane separation process for the gas phase and/or water phase, with the aim to remove unwanted components from either phase. A control device is used to let the gas flow through the gas membrane when the pressure in the pressure vessel rises higher than a certain adjustable value, and prevents the outflow of gas when the pressure drops lower than a certain adjustable value.

Another control device is used to let the water-sludge mixture flow through the sludge membrane 12, if the pressure in the vessel rises to a certain adjustable value, and prevents the outflow of the water-sludge mixture when the pressure drops lower than a certain adjustable value.

Flow 4 (influent) is carried through vessel 20 and pump 22 to inlet 25 of reactor 8. In the embodiment shown pump 22 is, based on efficiency, coupled to motor 24. In above-mentioned way, flow 4 is brought into the reactor. The produced biogas is disposed through exhaust 3, through the pneumatic motor 24 used to drive pump 22, or and through 14 and subsequently through 15, on to the gas-network. The sludge-water mixture is drained through exhaust 16. The 'dewatered' sludge is drained through drain 27. The sludge-water mixture is drained through exhaust 26. Clean, treated water is drained through exhaust 5. In the embodiment as shown, control device 2 is connected to valves 18, and the sensors in system 1. Herewith the process conditions are preserved and, if necessary, system 1 is driven.

To the embodiment shown, possible process conditions of system 1 are, for vessel 20, a volume of 5 $m^3$, with inflow of 2.5 $m^3$, on a pressure of 1 atm at 12° C., a COD of 32.8 g/l, and a Ph of 7. Reactor 8 has, for the gas phase 11, a volume of 7 $m^3$, temperature of 30° C. and a composition of 2400 mol $CH_4$ and 1600 mol $CO_2$. For liquid phase 10 a volume of 36 $m^3$ is available at a Ph of 7 and temperature of 30° C. The pressure in the reactor is within the range of 1-70 bar and, for example in case of sewage, within the range of 1-30 Bar.

Experiments have shown that the carbon dioxide level of the produced biogas is lower compared to biogas production processes via atmospheric pressure. This is caused by the extra solubility of carbon dioxide according to Henry's law in the water phase at high pressure. The liquid phase, at a temperature of 31° C. and a partial $CO_2$ pressure of 73 Bar or higher, also contains supercritical $CO_2$.

The liquids phase is saturated with carbon dioxide. This carbon dioxide, obtained from pressure reduction, is used to counteract the pollution and/or fouling and/or scaling of membranes 12. A control device 2 is used that closes valve 18 in the outgoing liquids-pipe 5 when the pollution on the membrane rises to a certain level.

To system 1, an untreated flow 4 is supplied. The microorganisms convert this whereby biogas is formed. This purifies the supplied flow. The produced biogas can be put to use for other purposes such as driving a pneumatic motor/pump 22,24, the separation of methane and $CO_2$ according to Henry, drive the membrane separation process, drive a heat pump and dewatering of sludge.

Additionally and next to the caloric- or combustible energy of the produced biogas, it is possible to also use the elevated pressure of this biogas in converting into another form of usable energy, such as labour. Hereby system 1 is, in fact, used in more than one way as an energy generator. Preferably, both functions regarding energy generation based on the realized high pressure in the pressure vessel 8, are combined with the purifying and/or treatment of a supplied flow 4.

Figure 2:
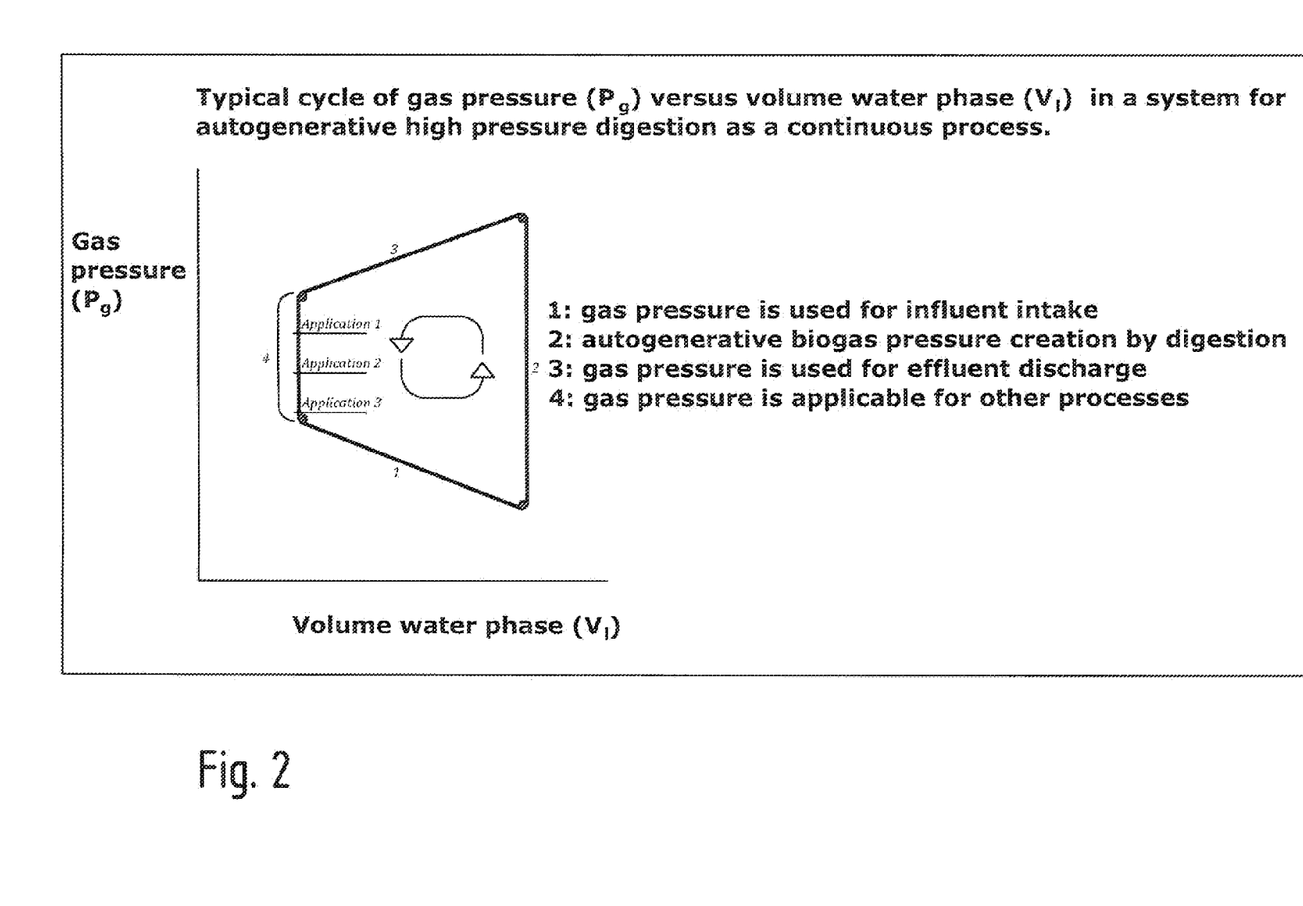
FIG. 2: a schematic simplification of the workings of the system from FIG. 1.

In addition to FIG. 1 (existing figure), the workings of the invention are described in FIG. 2. A perpetual cycle of 4 steps takes place, whereby in step 1, substratum is supplied through the gas pressure driven feed pump. In step 2 biogas is produced, in step 3 purified water (digestate) is removed and in step 4 other processes are driven (f.i. a heat pump or other users). Steps 1 till 4 can be repeated each on its own within a cycle and/or can be skipped and/or can be performed at random.

Figure 3:
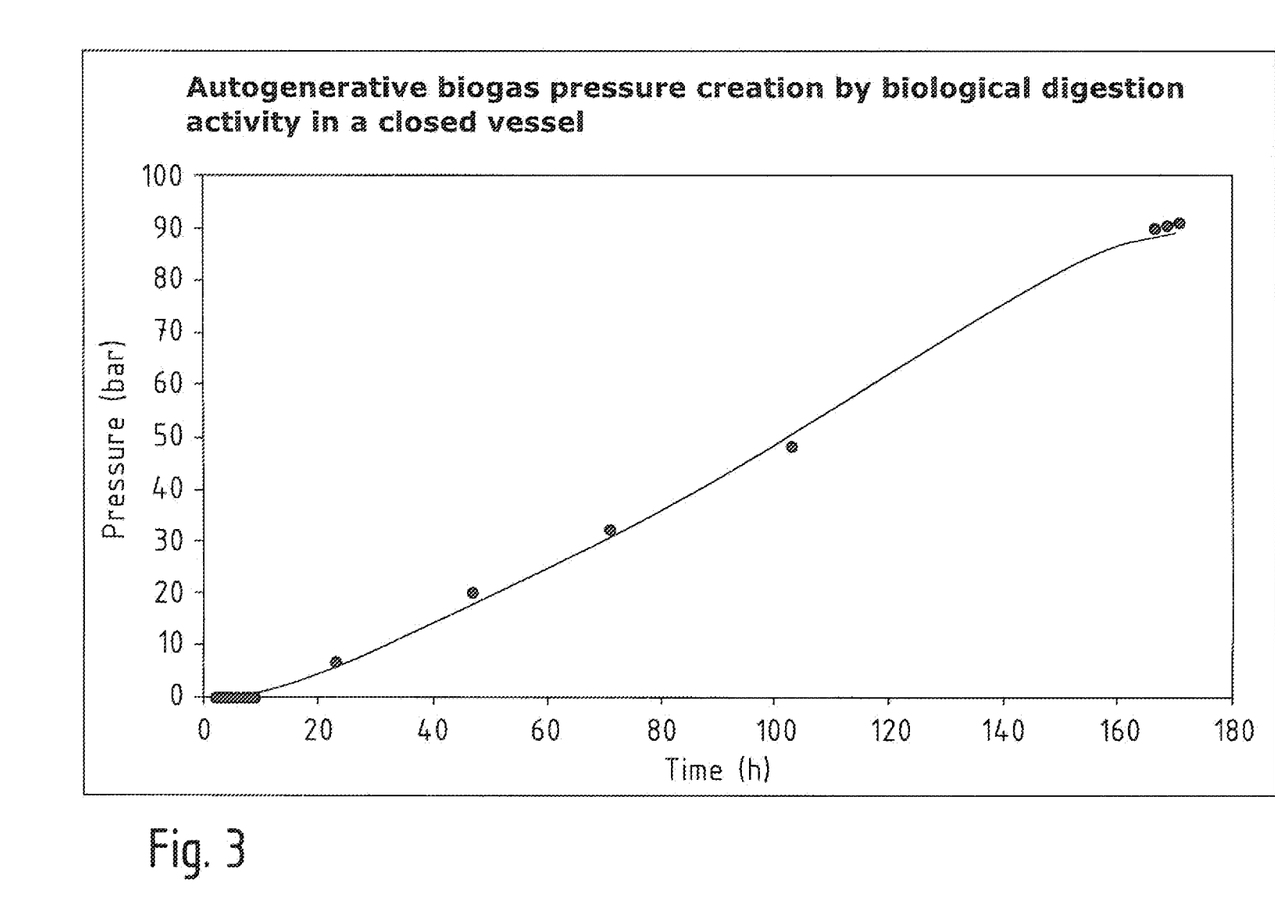
FIGS. 3-5; experimental results with the system from FIG. 1

System 1 served as a basis for a number of experiments. FIG. 3 shows the pressure (bar), as built in pressure vessel 8, in time (h).

Figure 4:
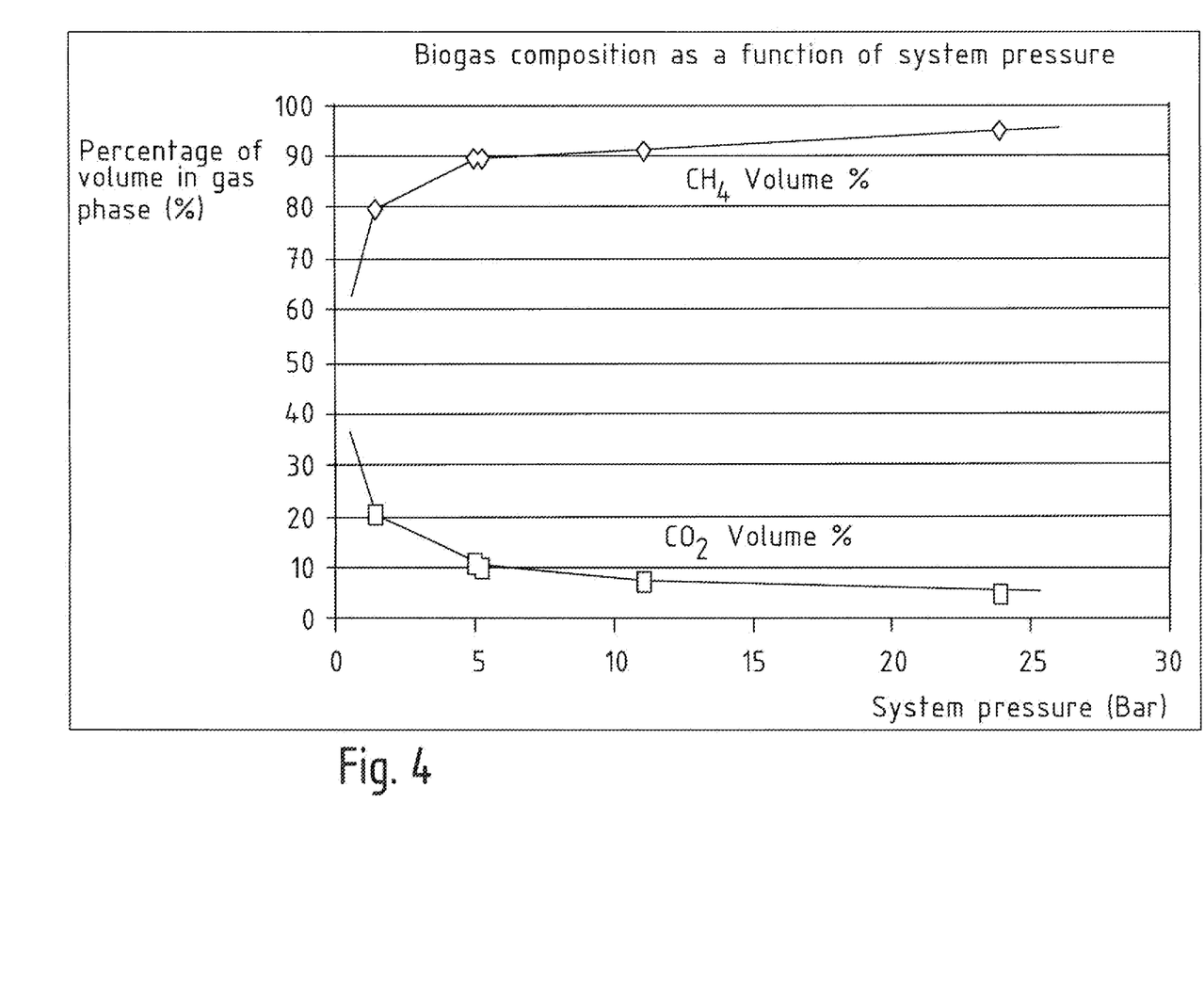

Herewith is demonstrated that high pressures can be generated in system 1 by microbial activity. The composition of the gas phase (11 in pressure vessel 8) is, amongst others, dependent on the pressure. This is demonstrated in FIG. 4, whereby the system pressure is indicated on the horizontal axes, and the composition in volume percentages for methane (♦) and carbon dioxide ( ) on the vertical axes. This shows that the carbon dioxide concentration in the gas phase decreases at higher pressure while the methane concentration increases.

Figure 5:
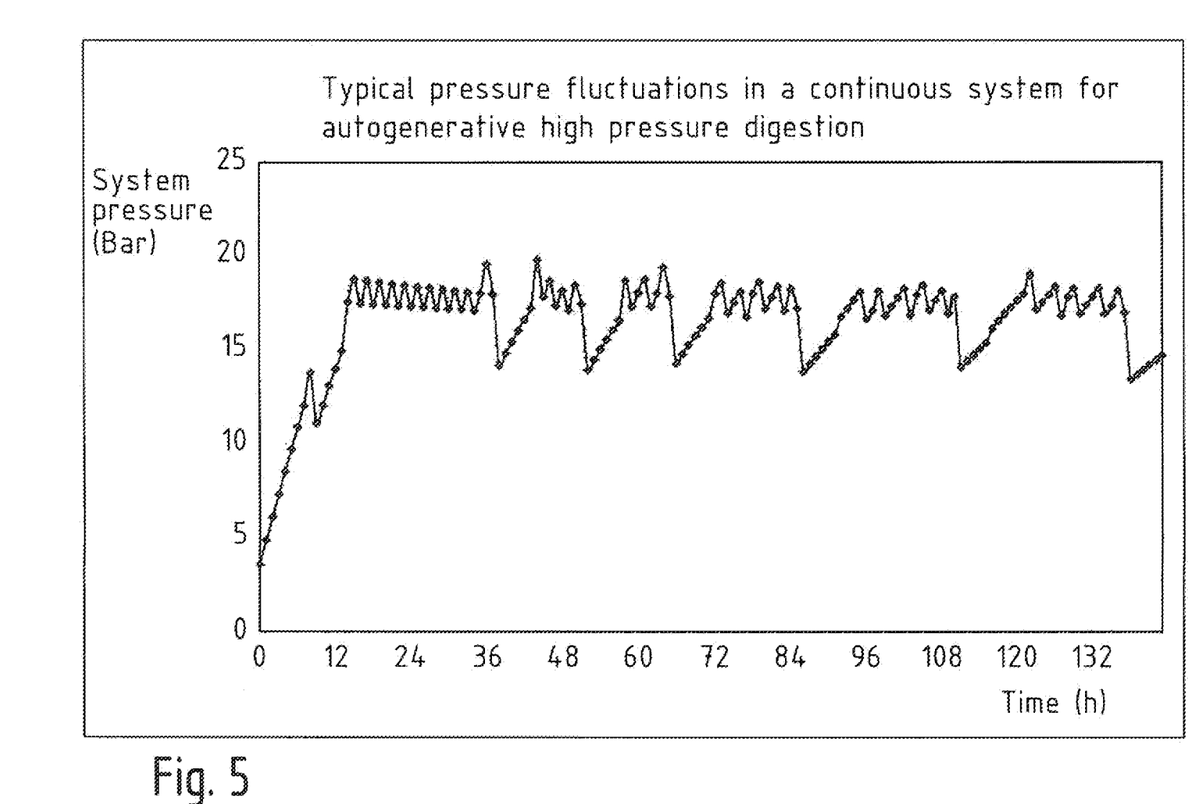

FIG. 5 shows the result of a dynamic simulation for the system pressure (bar) versus time (h) for a system of autogenerative high pressure digestion. The total pressure in system 1 increases from the start of the process by biotic gas production by the supply of an organic substrate. The small variations of the pressure result from the periodical release of produced green gas. On a regular basis, the produced gas is used to drive influent pump 22 in order to pump substrate into vessel 8. This is visible by the relatively large decreases in the pressure course. The substrate used is so called 'black water'.

To compare the energy performance of system 1 to conventional systems, a comparison was made to the so called "uniforme maatlat" (a standard instrument of the heat expertise centre of Agentschap NL) with uniform calculation rules and figures, to determine the emission of carbon dioxide, energy use and the contribution to sustainable energy production in the usage phase of alternative energy. From an energy consumption of −11 Watts per inhabitant in the present situation of waste water treatment with conventional systems, with system 1 it is possible, according to the present invention, to improve the energy production to +29 Watt per inhabitant. This difference of approximately 40 Watts per inhabitant is sufficient to illuminate a household with two childern (160 Watts in continuous operation) continuously (day and night) with 20 compact fluorescent lamps. Herewith it is possible to reduce the use of fossil energy of a reference residence (EPC 0,8) with approximately 5-10%, including the energy savings for the wastewater treatment plant. This means a reduction of the emission of fossil carbon dioxide of approximately 6% and the equivalent to an EPC-reduction of 0.07 points.

It is to be understood that this invention is not limited to particular aspects described, as such may vary. It is also to be understood that the terminology used herein is for the purpose of describing particular aspects only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual aspects described and illustrated herein has discrete components and features which may be readily separated from or combined with the features of any of the other several aspects without departing from the scope or spirit of the present invention. Any recited method can be carried out in the order of events recited or in any other order which is logically possible.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims. Accordingly, the preceding merely illustrates the principles of the invention.

It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and aspects of the invention as well as specific examples thereof, are intended to encompass both structural and functional equivalents thereof.

Additionally, it is intended that such equivalents include both currently known equivalents and equivalents developed in the future, i.e., any elements developed that perform the same function, regardless of structure. The scope of the present invention, therefore, is not intended to be limited to the exemplary aspects shown and described herein. Rather, the scope and spirit of present invention is embodied by the appended claims.

The invention claimed is:

1. A system for purification or treatment of organic material, waste, sewage, or combinations thereof under pressure, the system comprising:
    a sealable pressure vessel provided with an inlet to supply an influent to be purified or treated whereby the pressure vessel is configured to execute an anaerobe conversion of the influent in, amongst others, biogas;
    at least one exhaust to drain off products from the pressure vessel;
    a control system to control the purification or treatment;
    a pump that is functionally connected to the inlet for supplying the influent to be purified or treated; and
    an energy generator to regulate, generate, or regulate and generate energy with, at least, a part of produced biogas,
    wherein the pump is configured to be driven by the biogas from the pressure vessel, thereby using biologically built up pressure and converting it into usable energy in a form of labor, and wherein the system is a closed energetic system.

2. A system according to claim 1, further comprising a flow regulator to control the flow through a sludge water membrane.

3. A system according to claim 1, further comprising a membrane in the pressure vessel for separation of at least a part of the produced biogas of the influent to be purified or treated.

4. A system according to claim 3, wherein the membrane contains a selective gas membrane for removal of unwanted gasses.

5. A system according to claim 1, wherein the inlet and at least one exhaust comprise valves.

6. A system according claim 1, wherein the biogas comprises methane, carbon dioxide, hydrogen, thio carbon acid, hydrogen sulphide, or combinations thereof.

7. A system according claim 1, further comprising a pressure generator for realizing a pressure such that the produced biogas is additionally purified.

8. A system according claim 1, wherein the pump comprises a pneumatically driven pump.

9. A system according claim 1, further comprising a heat pump.

10. A system according claim 1, wherein the control system comprises a regulator to adjust the capacity of the pump to the pressure in the pressure vessel.

11. A system according claim 1, further containing a gas buffer to store the produced biogas.

12. A method for purification or treatment of organic waste, sewage, or combinations thereof, the method comprising steps of:
    providing a system according to claim 1;
    supplying the system with the influent to be purified or treated;
    separating and removing produced clean water from a residual flow; and
    separating and removing dewatered sludge from a residual flow.

13. The method according claim 12, wherein the produced biogas is used to generate a closed energetic system.

14. A method for production of biogas, the method comprising:
    providing a system according to claim 1;
    supplying the system with the influent to be purified or treated; and
    separating and removing the produced biogas of a residual flow.

15. The method according claim 14, wherein the biogas comprises methane.

16. The method according to claim 12, wherein carbon dioxide in the liquid phase is obtained by a pressure reduction and is used to counteract pollution, fouling, or scaling of membranes.

17. The method according to claim 14, wherein carbon dioxide in the liquid phase is obtained by a pressure reduction and is used to counteract pollution, fouling, or scaling of membranes.

18. A system according to claim 3, wherein the membrane contains a selective gas membrane for removal of hydrogen-thio-carbonacid.

19. A system according to claim 3, wherein the membrane contains a selective gas membrane for removal of carbon dioxide.